United States Patent
Boyle (10) Patent No.: US 7,146,094 B1
(45) Date of Patent: Dec. 5, 2006

(54) SET-TOP BOX THAT PROVIDES VIDEO DATA STREAM TO A DISPLAY DEVICE BASED ON SELECTION BETWEEN RECORDED VIDEO SIGNAL RECEIVED FROM THE DIGITAL VIDEO RECORDER AND A REAL-TIME VIDEO SIGNAL

(75) Inventor: William B. Boyle, Lake Forest, CA (US)

(73) Assignees: Keen Personal Technologies, Inc., Lake Forest, CA (US); Keen Personal Media, Inc., Lake Forest, CA (US)

( * ) Notice: Subject to any disclaimer, the term of this patent is extended or adjusted under 35 U.S.C. 154(b) by 1221 days.

(21) Appl. No.: 09/823,702

(22) Filed: Mar. 30, 2001

Related U.S. Application Data (63) Continuation-in-part of application No. 09/605,623, filed on Jun. 28, 2000, now Pat. No. 6,751,402, and a continuation-in-part of application No. 09/585,249, filed on May 31, 2000, now Pat. No. 6,442,328.

(51) Int. Cl.
*H04N 5/91* (2006.01)
(52) U.S. Cl. .......................... 386/95; 386/112
(58) Field of Classification Search .................. 386/46, 386/95, 83, 112, 124, 125, 94, 126
See application file for complete search history.

(56) References Cited

U.S. PATENT DOCUMENTS

| | | | |
|---|---|---|---|
| 4,879,611 A | 11/1989 | Fukui et al. | |
| 4,977,455 A | 12/1990 | Young | |
| 5,187,589 A | 2/1993 | Kono et al. | |
| 5,541,738 A | 7/1996 | Mankovitz | |
| 5,978,546 A * | 11/1999 | Abe et al. .................. | 386/124 |
| 6,040,851 A | 3/2000 | Cheng et al. | |
| 6,118,873 A | 9/2000 | Lotspiech et al. | |
| 6,133,908 A | 10/2000 | Scibora et al. | |
| 6,137,539 A | 10/2000 | Lownes et al. | |
| 6,141,002 A | 10/2000 | Kanungo et al. | |

(Continued)

OTHER PUBLICATIONS

Bioks, R.H.J., "The IEEE-1394 High Speed Serial Bus", Philips Journal of Research, vol. 50, No. 1/2, pp. 209-216, 1996.

*Primary Examiner*—Huy Nguyen
(74) *Attorney, Agent, or Firm*—Knobbe, Martens, Olson & Bear (57) ABSTRACT

A video system for presenting content from a content provider to a user includes a tuner to select a program from a plurality of programs. The tuner outputs the selected program at an analog output when the selected program is represented by an analog signal. An analog output port is coupled to the analog output of the tuner, and is configured to be connectable to a storage device to record the selected program represented by an analog signal. An analog signal processing circuit is coupled to the analog output of the tuner to receive the analog signal representing the selected program from the tuner and to generate a digital representation of the analog signal. A first interface module is configured to be connectable to the storage device to receive recorded programs from the storage device. An overlay module is coupled to the analog signal processing circuit and to the first interface module. The overlay module selectively overlays information to a program received from one of the analog signal processing circuit and the first interface module.

14 Claims, 5 Drawing Sheets

U.S. PATENT DOCUMENTS

| | | |
|---|---|---|
| 6,233,393 B1 | 5/2001 | Yanagihara et al. |
| 6,266,483 B1 | 7/2001 | Okada et al. |
| 6,292,618 B1 * | 9/2001 | Ohara et al. .................. 386/46 |
| 6,442,328 B1 | 8/2002 | Elliott et al. |
| 6,587,638 B1 * | 7/2003 | Watanabe et al. ............. 386/94 |
| 6,741,798 B1 * | 5/2004 | Maruyama et al. ........... 386/95 |
| 6,751,402 B1 | 6/2004 | Elliott et al. |
| 2003/0001970 A1 * | 1/2003 | Zeidler et al. ............. 348/569 |

* cited by examiner

SET-TOP BOX THAT PROVIDES VIDEO DATA STREAM TO A DISPLAY DEVICE BASED ON SELECTION BETWEEN RECORDED VIDEO SIGNAL RECEIVED FROM THE DIGITAL VIDEO RECORDER AND A REAL-TIME VIDEO SIGNAL

This application is a continuation-in-part of U.S. application Ser. No. 09/585,249, filed on May 31, 2000 now U.S. Pat. No. 6,442,328, and U.S. application Ser. No. 09/605,623, filed on Jun. 28, 2000 now U.S. Pat. No. 6,751,402.

BACKGROUND OF THE INVENTION

1. Field of the Invention

The present invention relates to information storage and display systems utilizing rotating storage drives, and more particularly, to video recording systems that record video data streams.

2. Description of the Related Art

Digital video recorders provide the capability of concurrently recording incoming streaming video data using hard disk drive technology and playing back previously recorded video data. As currently available, a digital video recorder receives incoming streaming video data from the output interface of a standard set-top box configured to receive the broadcast signals from a multiple-service operator (MSO), such as a cable provider, and the output of the digital video recorder is transmitted directly to a display device, such as a television. Such standard set-top boxes typically have only one input interface and one output interface. In response to commands from the user, the digital video recorder transmits to the display device either the incoming streaming video data from the output of the set-top box or the previously recorded video data.

Because currently available digital video recorders receive their input from the standard output interfaces of currently available set-top boxes, such digital video recorders require numerous components which are duplicates of components already utilized by the set-top boxes. For example, in order to view digital broadcast channels using a standard television, a set-top box must convert the input digital broadcast channels into output video signals which conform to a standard format for composite video, such as the National Television Standards Committee (NTSC) standard. This standard output format is generated by various components in the set-top box, such as a transport demultiplexer ("DEMUX"), an MPEG decoder, and an NTSC encoder. Additionally, the output from the set-top box may contain information from an on-screen display module. This information may represent programming information. The information may also list specialty capabilities such as picture-in-picture, which the user can enable. A digital video recorder compatible with such a configuration must convert the NTSC composite video received from the set-top box back into digital form for storage, and then reconvert again to NTSC composite video to play back the stored video signals. Therefore, just as the set-top box did, the digital video recorder requires a transport DEMUX, an MPEG decoder, and an NTSC encoder, which effectively duplicate components and functions of the set-top box.

Similarly, currently available digital video recorders also include a standard input interface that receives the output from the set-top box, and a modem that is configured to receive electronic program guide information from the MSO. Both the input interface and the modem of the digital video recorder duplicate components or functions found in currently available set-top boxes.

There is, therefore, a need to provide the capabilities of currently available digital video recorders and set-top boxes, while also enabling the reduction of the redundancy of functions and components among these digital video recorders and set-top boxes.

SUMMARY OF THE INVENTION

The present invention may be regarded as a video system for presenting content from a content provider to a user. The video system includes a tuner to select a program from a plurality of programs, wherein the tuner outputs the selected program at an analog output when the selected program is represented by an analog signal. An analog output port is coupled to the analog output of the tuner, and is configured to be connectable to a storage device to record the selected program represented by an analog signal. An analog signal processing circuit is coupled to the analog output of the tuner to receive the analog signal representing the selected program from the tuner and to generate a digital representation of the analog signal. A first interface module is configured to be connectable to the storage device to receive recorded programs from the storage device. An overlay module is coupled to the analog signal processing circuit and to the first interface module. The overlay module selectively overlays information to a program received from one of the analog signal processing circuit and the first interface module.

The present invention may be further regarded as a method of presenting content from a content provider to a user. The method selects a program from a plurality of programs and outputs the selected program at an analog output if the selected program is represented by an analog signal. The method provides the analog signal that represents the selected program at an analog output port to which a storage device is connectable for recording the selected program on the storage device. Further, the method converts the analog signal to a digital representation of the analog signal. The method overlays information to a selected one of a program represented by the analog signal, and a recorded program retrievable from the storage device.

DETAILED DESCRIPTION OF THE PREFERRED EMBODIMENT

Figure 1:
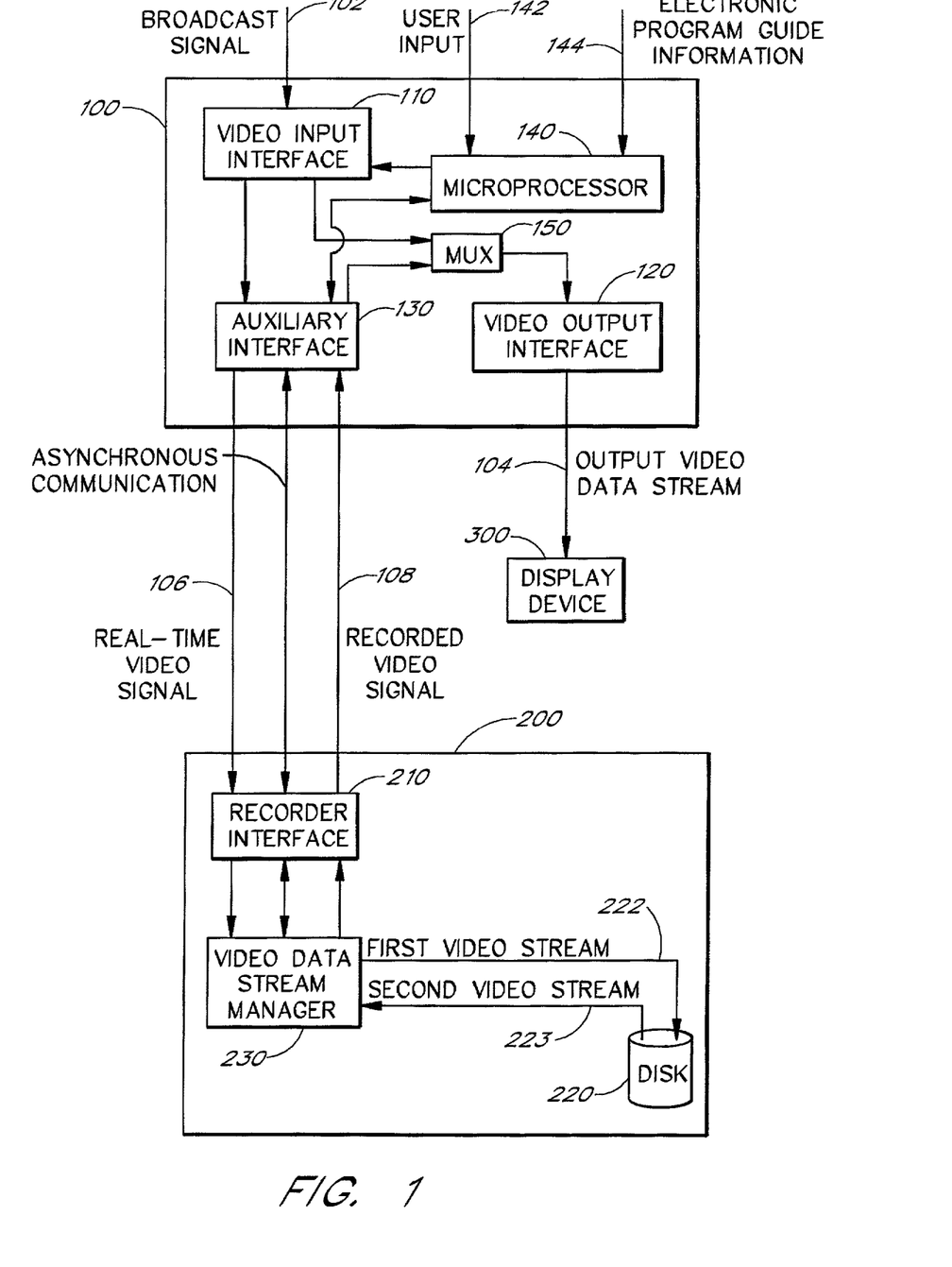
FIG. 1 schematically illustrates a digital video recorder in accordance with an embodiment of the present invention, the digital video recorder connectable to an auxiliary interface of a set-top box that provides a video data stream to a display device based on selection between recorded video signal received from the digital video recorder and a real-time video signal.

FIG. 1 schematically illustrates a digital video recorder 200 in accordance with an embodiment of the present invention. The digital video recorder 200 is connectable to a set-top box 100 that includes a video input interface 110 that receives a broadcast signal 102, a video output interface 120 that provides an output video data stream 104 to a display device 300. The set-top box 100 has at least one auxiliary interface 130 that supports connection of the digital video recorder 200 to the set-top box 100, a microprocessor 140 that generates a command in response to user input 142 that initiates a playback interval, and a multiplexer 150 coupled to the video output interface 120 and the microprocessor 140. The set-top box 100 is configured to (a) use the video input interface 110 to generate a real-time video signal 106, (b) recognize connection of the digital video recorder 200 to the set-top box 100 and subsequently continuously provide the real-time video signal 106 to the digital video recorder 200, and (c) receive a recorded video signal 108 from the digital video recorder 200 during the playback interval. The digital video recorder 200 comprises at least one recorder interface 210 for connecting the digital video recorder 200 to the auxiliary interface 130 of the set-top box 100. The recorder interface 210 continuously receives the real-time video signal 106 from the set-top box 100 and provides the recorded video signal 108 to the set-top box 100 during the playback interval. The digital video recorder 200 further comprises a disk 220 and a video data stream manager 230. In response to the real-time video signal 106, the video data stream manager 230 provides a first video stream 222 to store a selected video segment on the disk 220. In response to the command from the microprocessor 140, the video data stream manager 230 receives a second video stream 223 based on the selected video segment stored on the disk 220 to generate the recorded video signal 108. The multiplexer 150 of the set-top box 100 selects the real-time video signal 106 during a real-time interval and selects the recorded video signal 108 during the playback interval to generate the output video data stream 104 that is provided to the display device 300.

In one embodiment of the present invention, the broadcast signal 102 is transmitted from a multiple-service operator, also known as an MSO. MSOs are video data service providers that supply video programming to multiple users. Examples of MSOs include, but are not limited to, cable television systems and satellite systems. Alternatively, the broadcast signal 102 can be received from UHF or VHF broadcast signals using an antenna. The broadcast signal 102 is typically in the form of analog rf signals containing video programming from multiple channels, and it may carry the video programming in analog or digital form.

In the preferred embodiment of the present invention, the microprocessor 140 of the set-top box 100 controls the operation of both the set-top box 100 and the digital video recorder 200 in response to user input 142 and electronic program guide information 144. By communicating with the video data stream manager 230 of the digital video recorder 200, the microprocessor 140 recognizes the connection of the digital video recorder 200 to the set-top box 100 and receives information regarding the first video stream 222 provided by the video stream manager 230 in response to the real-time video signal 106 to store the selected video segment on the disk 220. The microprocessor 140 also commands the video data stream manager 230 to receive the second video stream 223 based on the selected video segment stored on the disk 220 during a playback interval initiated by the user input 142. By communicating with the multiplexer 150 of the set-top box 100, the microprocessor 140 determines whether the real-time video signal 106 or the recorded video signal 108 is used to generate the output video data stream 104 provided to the display device 300. Times at which the real-time video signal 106 is used are denoted as real-time intervals, and times at which the recorded video signal 108 is used are denoted as playback intervals.

The user input 142 includes commands from the user to control various operation parameters of the set-top box 100 and the digital video recorder 200, such as record, playback, and display commands. In certain embodiments, the user input 142 includes the user turning on the set-top box 100 or the digital video recorder 200. Alternatively, the user input 142 is a playback command. The user input 142 is generated by the user using an appropriate communication technology, such as remote control devices or keypad devices. Persons skilled in the art are able to select an appropriate communication technology for the user to generate the user input 142.

The electronic program guide information 144 contains information regarding the broadcast schedules from various broadcast channels. In the embodiment illustrated in FIG. 1, the electronic program guide information 144 is a database containing information regarding the broadcast schedules from various broadcast channels. This information is typically expressed in the form of a program grid with columns denoting the time periods, and with separate rows for each of the available broadcast channels. In one embodiment, the electronic program guide information 144 is communicated to the microprocessor 140 via a separate input channel (e.g., via a phone line connection). Alternatively, in other embodiments of the present invention, the electronic program guide information 144 is received from the broadcast signal 102. In addition, the electronic program guide information 144 is temporarily stored in memory. The memory may be dedicated flash memory within the set-top box 100 or the digital video recorder 200. The memory may also be a portion of the disk 220 of the digital video recorder 200. Typically, the electronic program guide information 144 is communicated to the user by displaying it directly on the display device 300 being viewed by the user. The user may then provide appropriate user input 142 to the microprocessor 140, which uses the electronic program guide information 144 to generate appropriate commands. Persons skilled in the art are able to select an appropriate configuration of the electronic program guide information 144 and the method of communicating its information to both the user and the microprocessor 140 compatible with the present invention.

Figure 2:
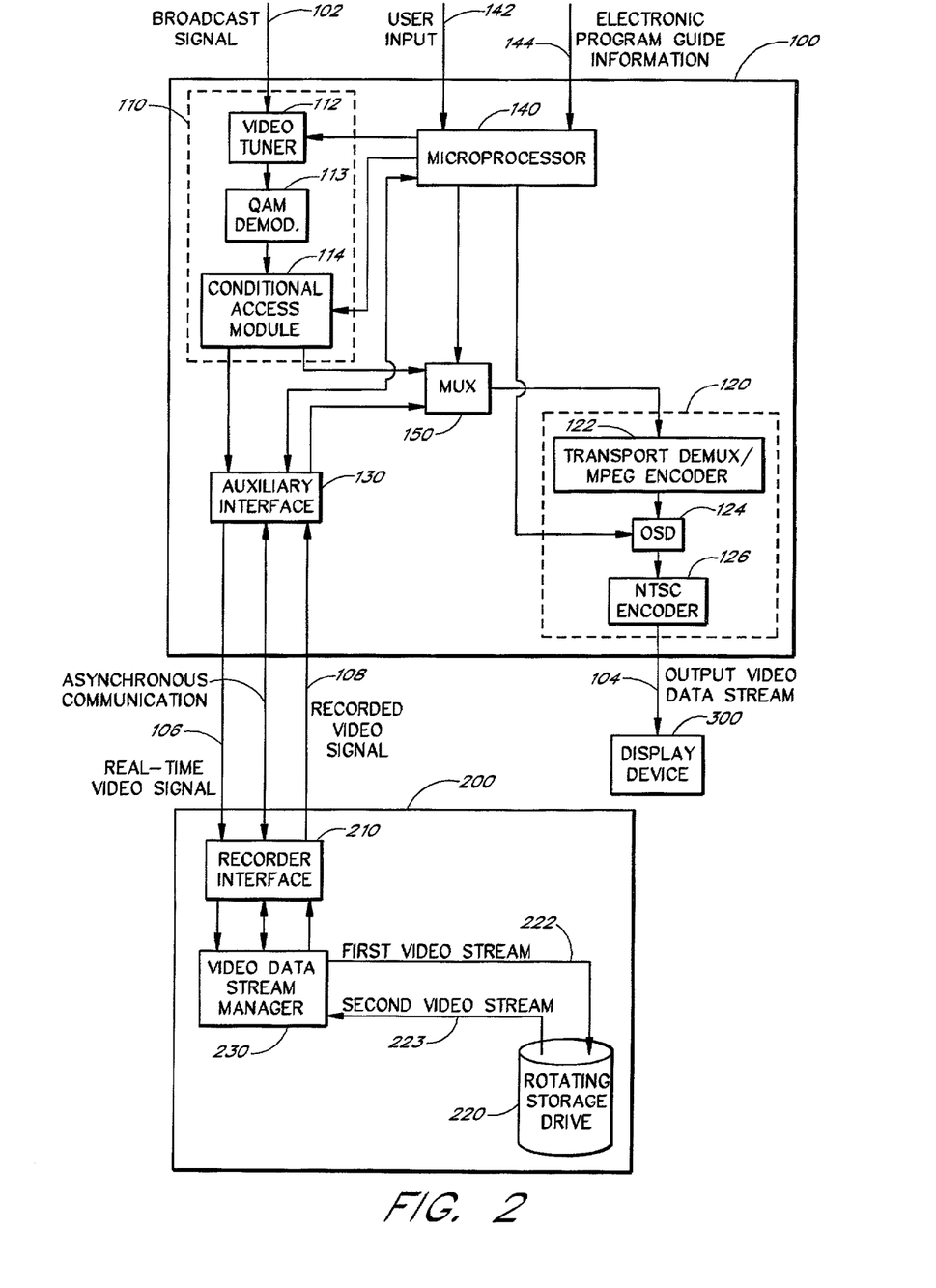
FIG. 2 schematically illustrates an exemplary embodiment of the present invention wherein the digital video recorder and set-top box are configured to be compatible with digital video programming.

FIG. 2 schematically illustrates one embodiment of the present invention compatible with a digital programming channel. Note that other embodiments of the present invention are compatible with analog programming channels, or both analog and digital programming channels. The video input interface 110 comprises a video tuner 112 that receives the broadcast signal 102, a quadrature amplitude modulation (QAM) demodulator 113, and a conditional access module 114. In response to commands from the microprocessor 140 in response to the user input 142, the video tuner 112 selects one transponder signal from the multiple transponder signals contained in the broadcast signal 102, and transmits the selected transponder signal to the QAM demodulator 113, which converts the analog rf signal into a digital signal. This digital signal corresponding to the selected transponder signal is a digitally-formatted video data stream compressed under an MPEG (Motion Pictures Experts Group) standard, such as MPEG-2 or MPEG-4, and is transmitted to the conditional access module 114. In other alternative embodiments, the selected transponder signal is compressed with other compression standards, including but not limited to, wavelet compression, motion JPEG compression, and DV25 compression. This digital signal contains approximately six separate digital video channels, and the conditional access module 114 selects one of these digital video channels in response to commands from the microprocessor 140 in response to the user input 142, and generates a compressed single program transport stream representation of the real-time video signal 106 that is transmitted to the multiplexer 150 and to the auxiliary interface 130.

During a real-time interval, defined as times in which the user input 142 indicates that the user wants to view the broadcast signal 102 in real-time, the microprocessor 140 commands the multiplexer 150 to transmit the real-time video signal 106 from the conditional access module 114 to the video output interface 120. In the preferred embodiment illustrated in FIG. 2, the video output interface 120 comprises a transport demultiplexer ("DEMUX")/MPEG decoder 122, an on-screen display (OSD) module 124 comprising a display multiplexer, and an NTSC encoder 126. The transport DEMUX/MPEG decoder 122 sorts out and synchronizes the compressed single program transport stream representation of the real-time video signal 106 from the multiplexer 150, discarding unneeded MPEG packets and generating a decompressed digital signal transmitted to the OSD module 124. The OSD module 124 can mix text, graphics, or additional video images selected by its display multiplexer with the decompressed digital signal from the transport DEMUX/MPEG decoder 122 to generate digital signals containing electronic program guide information 144, system status information, picture-in-picture, or other specialty displays requested by the user. The output video data stream 104 generated by the NTSC encoder 126 in response to the digital signal from the OSD module 124 is then transmitted to the display device 300, typically a television. In other embodiments, the NTSC encoder 126 is replaced by an encoder compatible with another standard composite video format, including but not limited to, PAL or RGB.

Concurrently, the compressed single program transport stream representation of the real-time video signal 106 from the conditional access module 114 is also transmitted to the auxiliary interface 130. The microprocessor 140 communicates with the video data stream manager 230 of the digital video recorder 200 via the auxiliary interface 130 and the recorder interface 210. Upon recognizing connection of the digital video recorder 200 to the set-top box 100, the microprocessor 140 commands the auxiliary interface 130 to continuously transmit the real-time video signal 106 to the recorder interface 210 of the digital video recorder 200.

In the preferred embodiment illustrated in FIG. 2, the auxiliary interface 130 supports isochronous communication compatible with the IEEE 1394 standard, which is described in the "IEEE Std 1394-1995 IEEE Standard for a High Performance Serial Bus," Aug. 30, 1996, which is incorporated by reference herein. The recorder interface 210 also supports isochronous communication compatible with the IEEE 1394 standard. In other embodiments, the auxiliary interface 130 and the recorder interface 210 also include asynchronous or synchronous communication capabilities to communicate various commands and information between the microprocessor 140 and the video data stream manager 230.

In particular embodiments of the present invention, the auxiliary interface 130 and the recorder interface 210 include the capability to encrypt the real-time video signal 106 sent to the video data stream manager 230 to provide protection from unauthorized copying or transporting of stored video data by removing the digital video recorder 200 and reattaching it to a different set-top box 100. Similarly, the auxiliary interface 130 and the recorder interface 210 advantageously include the capability to decrypt the recorded video signal 108 sent to the multiplexer 150 from the video data stream manager 230.

In the preferred embodiment, the auxiliary interface 130 and the recorder interface 210 are compatible with DTLA ("Digital Transmission Licensing Administrator") copying protection utilizing authentication key exchange. DTLA copy protection is a well-known copy protection system, compatible with the IEEE 1394 standard, and is described in "Digital Transmission Content Protection Specification Revision 1.0," Mar. 17, 1999, which is incorporated by reference herein. By applying DTLA copy protection to the real-time video signal 106 and the recorded video signal 108 transmitted between the auxiliary interface 130 and the recorder interface 210, the real-time video signal 106 and the recorded video signal 108 are protected from unauthorized copying.

Upon continuously receiving the real-time video signal 106 from the auxiliary interface 130, the recorder interface 210 generates a single program transport stream representation of the real-time video signal 106, which is transmitted to the video data stream manager 230. The video data stream manager 230 provides a first video stream 222 in response to the real-time video signal 106 to store a selected video segment on the disk 220. In the preferred embodiment of the present invention, the disk 220 is a component of a rotating storage drive (e.g., a hard disk drive) compatible with the IEEE 1394 standard. Alternatively, the disk 220 can be a component of a writable digital video disk (DVD) drive, or of a drive that utilizes another technology that provides writable non-volatile storage.

Upon receiving a playback command from the user input 142, the microprocessor 140 transmits an appropriate playback command to the multiplexer 150 and to the video data stream manager 230, thereby terminating the real-time interval, and initiating a playback interval. Processing of the incoming broadcast signal 102 and the recording of the real-time video signal 106 continue during the playback interval as they had during the real-time interval. In response to the playback command from the microprocessor 140, the video data stream manager 230 receives a second video stream 223 based on the selected video segment previously stored on the disk 220. The second video stream 223 is used by the video data stream manager 230 to generate a single program transport stream representation of the recorded video signal 108, which is transmitted to the recorder interface 210. The recorder interface 210 transmits the recorded video signal 108 to the multiplexer 150 via the auxiliary interface 130 of the set-top box 100.

In response to the playback command from the microprocessor 140, the multiplexer 150 transmits the recorded video signal 108 to the video output interface 120. In response to the recorded video signal 108, the video output interface 120 then transmits an output video data stream 104 to the display device, thereby permitting the user to view previously stored video images. In addition, by utilizing the auxiliary interface 130 and the recorder interface 210 to transfer data streams between the set-top box 100 and the digital video recorder 200, the digital video recorder 200 does not require an additional video input interface capable of receiving the broadcast signal 102 or an additional video output interface capable of transmitting an output video data stream 104 directly to a display device 300. Furthermore, by sharing the electronic program guide information 144 with the set-top box 100, the digital video recorder 200 does not need a modem connected to the MSO to provide programming information. In this way, the redundancy of components and functions between the set-top box 100 and the digital video recorder 200 is reduced, thereby providing a more cost-effective alternative to currently available systems.

Figure 3:
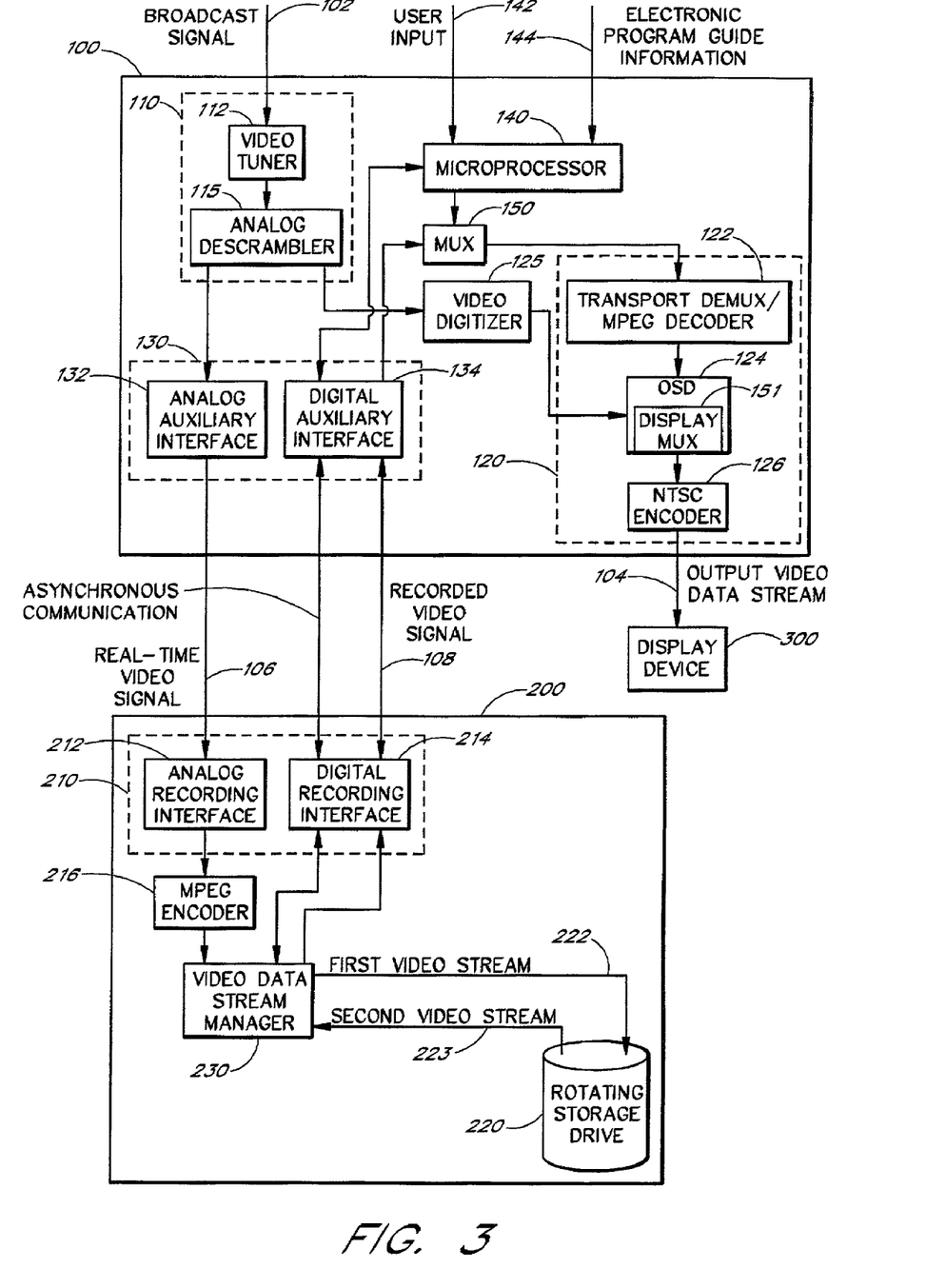
FIG. 3 schematically illustrates an exemplary embodiment of the present invention wherein the digital video recorder and set-top box are configured to be compatible with analog video programming.

FIG. 3 schematically illustrates one embodiment of the present invention compatible with an analog programming channel. The video input interface 110 comprises a video tuner 112 that receives the broadcast signal 102 and comprises an analog descrambler 115. In response to commands generated by the microprocessor 140 in response to the user input 142, the video tuner 112 selects one broadcast channel from the multiple broadcast channels contained in the broadcast signal 102 and transmits the selected broadcast channel to the analog descrambler 115. In response to the selected broadcast channel, the analog descrambler 115 generates a baseband composite video representation of the real-time video signal 106. The analog descrambler 115 provides the capability to view broadcast channels which require descrambling (e.g., for premium channels which are only accessible by a user for an additional fee). Non-scrambled broadcast channels and non-accessible scrambled broadcast channels are transmitted through the analog descrambler 115 without descrambling. In embodiments where there is no need to descramble any of the broadcast channels, the analog descrambler 115 is not included in the set-top box 100, and the video tuner 112 generates a baseband composite video representation of the real-time video signal 106. The baseband composite video representation of the real-time video signal 106 generated by the analog descrambler 115 is transmitted to the auxiliary interface 130 and to a video digitizer 125 coupled to the OSD module 124 of the video output interface 120.

The video digitizer 125 generates a digital representation of the real-time video signal 106 in response to the baseband composite video representation of the real-time video signal 106 from the analog descrambler 115. The digital representation of the real-time video signal 106 is then transmitted to the OSD module 124, which comprises a display multiplexer 151. During a real-time interval (i.e., times in which the user wants to view the broadcast signal 102 in real-time), the microprocessor 140 commands the display multiplexer 151 of the OSD module 124 to transmit the real-time video signal 106 to the NTSC encoder 126. In response to the real-time video signal 106, the NTSC encoder 126 generates an output video data stream 104 which is transmitted to the display device 300.

Concurrently, the baseband composite video representation of the real-time video signal 106 from the analog descrambler 115 is also transmitted to the auxiliary interface 130. In the embodiment illustrated in FIG. 3, the at least one auxiliary interface 130 comprises an analog auxiliary interface 132 which receives the baseband composite video representation of the real-time video signal 106. The at least one auxiliary interface 130 also comprises a digital auxiliary interface 134 that supports isochronous communication compatible with the IEEE 1394 standard and DTLA copy protection. Similarly, the at least one recorder interface 210 of the digital video recorder 200 comprises an analog recorder interface 212 and a digital recorder interface 214 that supports isochronous communication compatible with the IEEE 1394 standard and DTLA copy protection.

The analog auxiliary interface 132 continuously transmits the real-time video signal 106 via the analog recorder interface 212 to an MPEG encoder 216. In response to the continuously received real-time video signal 106, the MPEG encoder generates a single program transport stream representation of the real-time video signal 106, which is transmitted to the video data stream manager 230. In response to the real-time video signal 106, the video data stream manager 230 provides a first video stream 222 to store a selected video segment on the disk 220.

Upon receiving a playback command from the user input 142, the microprocessor 140 transmits an appropriate playback command to the multiplexer 150, to the display multiplexer 151, and to the video data stream manager 230, thereby terminating the real-time interval and initiating a playback interval. The processing of the incoming broadcast signal 102 and the recording of the real-time video signal 106 continue during the playback interval as they had during the real-time interval. In response to the playback command from the microprocessor 140, the video data stream manager 230 receives a second video stream 223 based on the selected video segment previously stored on the disk 220. The second video stream 223 is used by the video data stream manager 230 to generate a single program transport stream representation of the recorded video signal 108, which is transmitted to the digital recorder interface 214. The digital recorder interface 214 transmits the recorded video signal 108 to the multiplexer 150 via the digital auxiliary interface 134 of the set-top box 100.

In response to the playback command from the microprocessor 140, the multiplexer 150 transmits the recorded video signal 108 to the video output interface 120. The video output interface 120 comprises the transport DEMUX/MPEG decoder 122, the OSD module 124, and the NTSC encoder 126. In response to the playback command from the microprocessor 140, the display multiplexer 151 of the OSD module 124 responds to the recorded video signal 108 from the transport DEMUX/MPEG decoder 122 in generating the output video data stream 104 transmitted to the display device 300, thereby permitting the user to view previously stored video images. Note that in this particular embodiment, the display multiplexer 151 in the OSD module 124 of the video output interface 120 performs the actual selection between the real-time video signal 106 and the recorded video signal 108. This preferred embodiment of the present invention reduces the redundancy of components and functions between the set-top box 100 and the digital video recorder 200, thereby providing a more cost-effective alternative to currently available systems.

Figure 4:
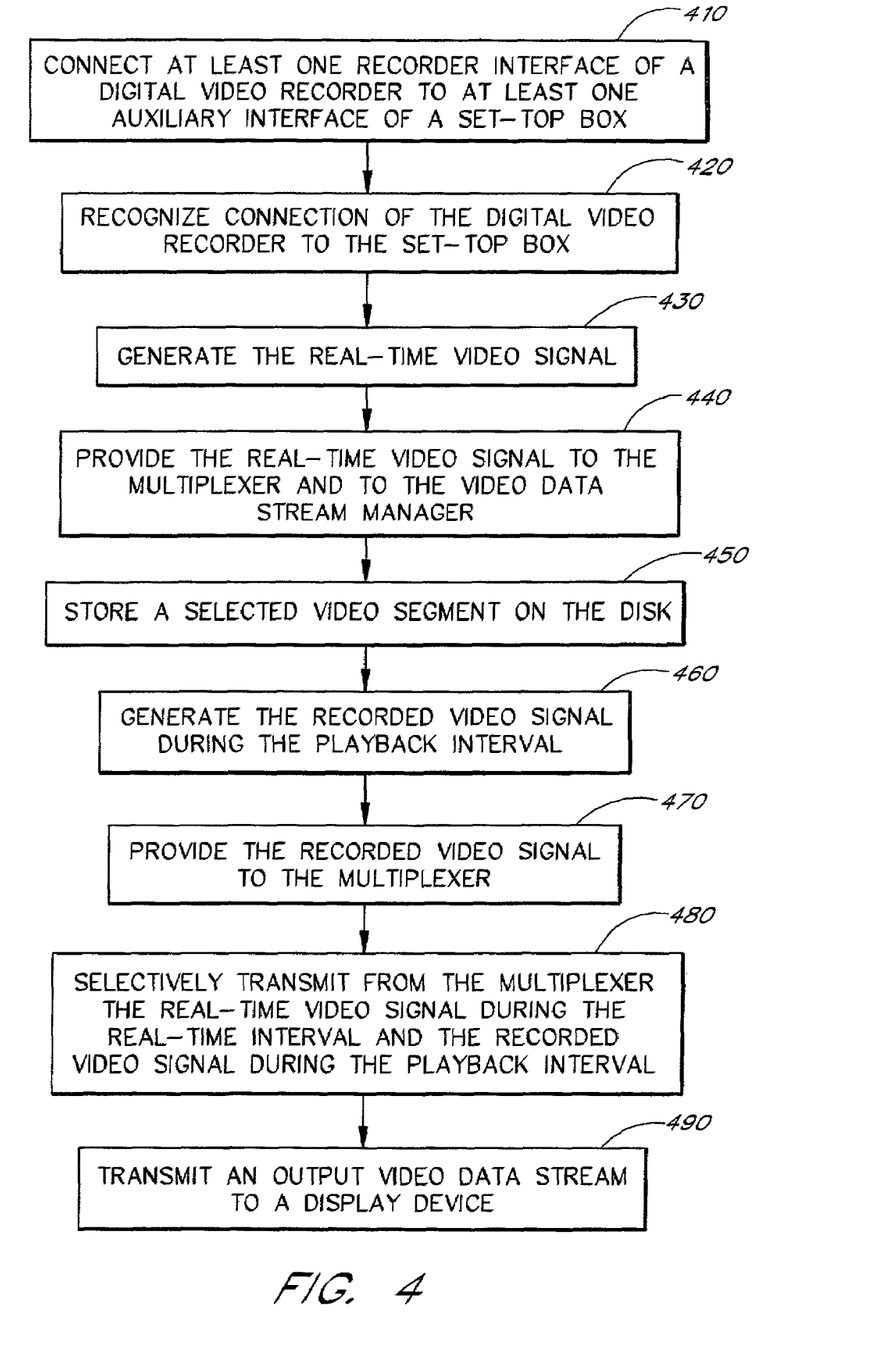
FIG. 4 is a flow diagram in accordance with an embodiment of the present invention, in which the digital video recorder is connectable to an auxiliary interface of a set-top box that provides a video data stream to a display device based on selection between recorded video signal received from the digital video recorder and a real-time video signal.

FIG. 4 is a flow diagram in accordance with an embodiment of the present invention, in which the digital video recorder 200 is connectable to an auxiliary interface 130 of a set-top box 100 that provides video data stream to a display device 300 based on selection between recorded video signal 108 received from the digital video recorder 200 and a real-time video signal 106. The flow diagram is described with reference to the set-top box 100 and the digital video recorder 200 illustrated in FIG. 1. Persons skilled in the art are able to recognize that, while the flow diagram illustrates a particular embodiment with steps in a particular order, other embodiments with different orders of steps are also compatible with the present invention.

In a step 410, the recorder interface 210 of the digital video recorder 200 is connected to the auxiliary interface 130 of the set-top box 100. The set-top box includes the video input interface 110, the video output interface 120, the microprocessor 140 that generates a command in response to user input 142 that initiates a playback interval, and a multiplexer 150 coupled to the video output interface 120 and the microprocessor 140. The digital video recorder 200 includes a disk 220 and a video data stream controller 230.

In a step 420, the connection of the digital video recorder 200 to the set-top box 100 is recognized by the microprocessor 140 through communications between the microprocessor 140 and the video data stream manager 230. In the preferred embodiment of the present invention, this communication is asynchronous, and occurs via the auxiliary interface 130 and the recorder interface 210. Alternatively, the microprocessor 140 and the video data stream manager 230 utilize synchronous communication.

In a step 430, the real-time video signal 106 is generated in response to the broadcast signal 102. The broadcast signal 102 is received by the video input interface 110 of the set-top box 100.

In a step 440, the real-time video signal 106 is continuously provided to the multiplexer 150 and to the video data stream manager 230 of the digital video recorder 200. The real-time video signal 106 is continuously provided to the video data stream manager 230 via the auxiliary interface 130 and the recorder interface 210.

In a step 450, the first video stream 222 is provided to store the selected video segment on the disk 220. The first video stream 222 is provided by the video data stream manager 230 in response to the real-time video signal 106.

In a step 460, the video data stream manager 230 receives the second video stream 223 in response to the command from the microprocessor 140. The video data stream manager 230 receives the recorded video signal 108 in response to the second selected video stream 223. The playback interval is signified by a command from the microprocessor 140 in response to the user input 142.

In a step 470, the recorded video signal 108 is provided to the multiplexer 150 via the recorder interface 210 and the auxiliary interface 130 during the playback interval.

In a step 480, the multiplexer 150 selectively transmits the real-time video signal 106 during the real-time interval and selectively transmits the recorded video signal 108 during the playback interval. In a step 490, the output video data stream 104 is transmitted to the display device 300. The output video data stream 104 is generated by the video output interface 120 in response to the selectively transmitted video signal from the multiplexer 150.

Figure 5:
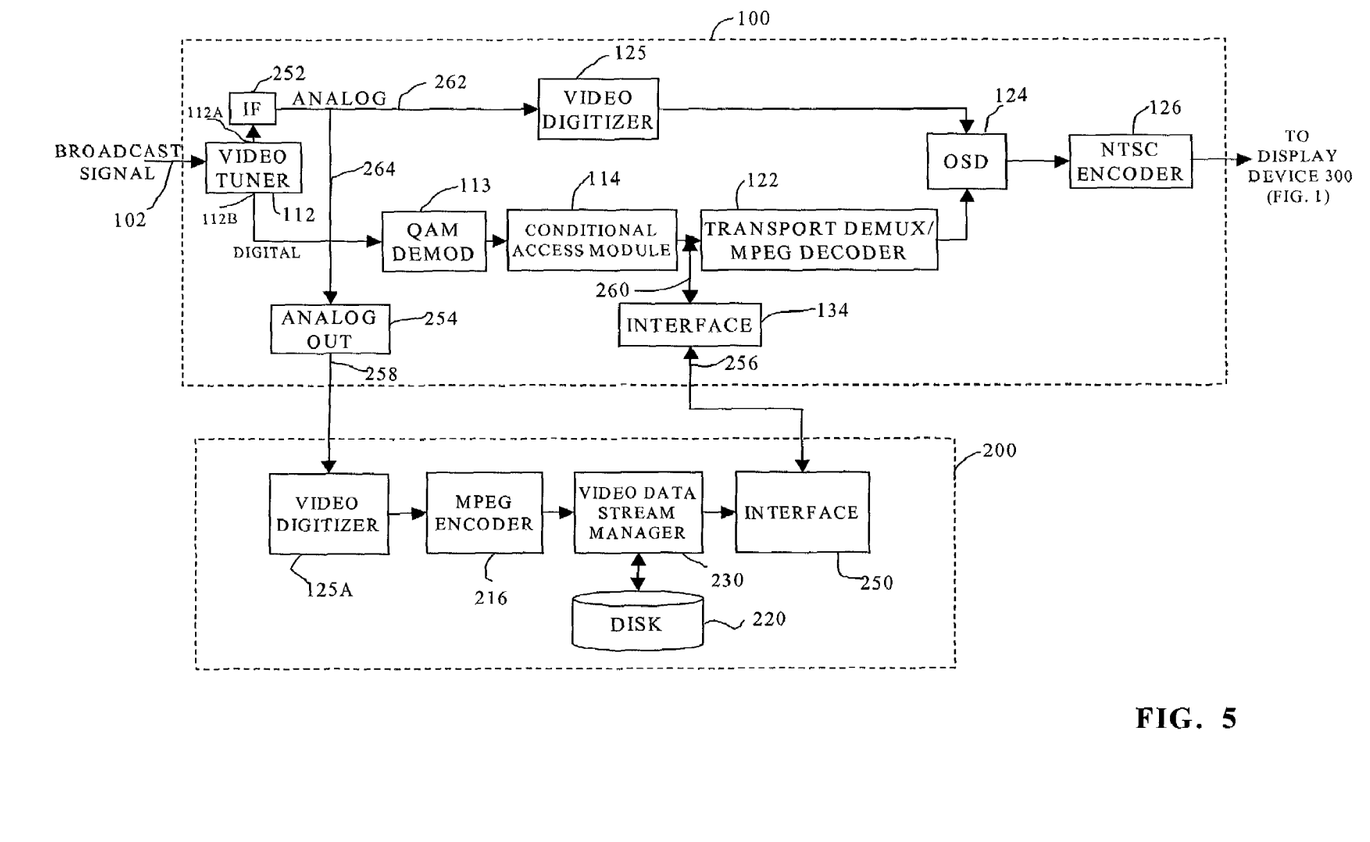
FIG. 5 schematically illustrates another embodiment of the present invention, in which the digital video recorder and the set-top box are configured to be compatible with analog video programming and digital video programming.

FIG. 5 schematically illustrates another embodiment of the present invention, in which the digital video recorder 200 and the set-top box 100 are configured to be compatible with analog video programming and digital video programming. The set top box 100 is connected to the digital video recorder 200 as described above. As the embodiment of FIG. 3, the set top box 100 includes the tuner 112, the OSD module 124, the video digitizer 125, the transport DEMUX/MPEG decoder 122 and the NTSC encoder 126.

The tuner 112 has an analog output 112A for the analog signal and a digital output 112B for a digital signal. The analog output 112A is part of an analog branch that extends between the tuner 112 and the OSD module 124. The digital output 112B is part of a digital branch that extends between the tuner 112 and the OSD module 124.

The analog branch includes the video digitizer 125, which provides for analog signal processing, and an IF module 252, wherein the IF module 252 is coupled to the analog output 112A of the tuner 112, to the video digitizer 125 via a connection 262 and to an analog output port 254 via a connection 264. The IF module 252 transforms the analog signal received from the tuner 112 into the baseband.

The digital branch includes the QAM demodulator 113 ("QAM DEMOD"), the conditional access module 114 and the transport DEMUX/MPEG decoder 122. The QAM demodulator 113 is connected to the digital output 112B of the tuner 112 and to the conditional access module 114. An output of the conditional access module 114 is connected to the transport DEMUX/MPEG decoder 122 and to the interface module 134. The transport DEMUX/MPEG decoder 122 is connected to the OSD module 124. A connection 260 connects the interface module 134 to an output of the conditional access module 114 and to an input of the transport DEMUX/MPEG decoder 122. Further, a connection 256 connects the interface module 134 to the digital video recorder 200.

The components of the digital branch process the digital signal received from the tuner 112 and either forward the digital signal to the digital video recorder 200 for recording a selected program or to the display device 300 connected to the set top box 100. Further, the components of the digital branch process digital signals received from the digital video recorder 200 prior to forwarding the processed signals to the display device 300 during playing back a selected program.

The digital video recorder 200 connected to the set top box 100 includes a video digitizer 125A, the MPEG encoder 216, the video data stream manager 230 and the disk 220. The video data stream manager 230 is further connected to an interface 250 which is in communication with the interface 134 via the connection 256. The video digitizer 125A receives the analog signal from the tuner 112 via the analog output port 254 and a connection 258. The components of the digital video recorder 200 operate as described above.

In accordance with the present invention, the digital video recorder 200 is releasably connected to the set top box 100. More particularly, the digital video recorder 200 is releasably connected to the analog output port 254 via the connection 258, and to the interface 134 via the connection 256. One advantage of the system is that the digital video recorder 200 receives the analog signal that represents a selected program from the tuner 112, i.e., before any overlay information is added to the program. The digital video recorder 200, therefore, records the program without the overlay information.

What is claimed is:

1. A video system for presenting content from a content provider to a user, comprising:
   a tuner configured to select a program from a plurality of programs, wherein the tuner transmits a first analog signal representing the selected program via a first connection and transmits a second analog signal representing the selected program via a second connection;
   an analog output port coupled to the tuner via the first connection to receive the first analog signal representing the selected program from the tuner, wherein the analog output port is configured to be connectable to an external storage device to transmit the first analog signal representing the selected program to the external storage device;
   an analog signal processing circuit coupled to the tuner via the second connection to receive the second analog signal representing the selected program from the tuner and to generate a digital representation of the second analog signal;

a first interface module configured to be connectable to the external storage device to receive recorded programs from the external storage device; and an overlay module coupled to the analog signal processing circuit and to the first interface module, the overlay module configured to selectively overlay information to a program received from one of the analog signal processing circuit and the first interface module.

2. The system of claim 1, further comprising an encoder coupled to the overlay module and connectable to a display device for presenting the selected program to a user.

3. The system of claim 2, wherein the analog output port and the first interface module are configured to couple to the external storage device in a parallel manner so that a selected program is recorded prior to overlaying the overlay information.

4. The system of claim 1, wherein the tuner outputs the selected program at a digital output when the selected program is represented by a digital signal.

5. The system of claim 4, wherein the first interface module is part of a digital signal processing circuit, wherein the digital signal processing circuit further includes a decoder coupled to be selectively in communication with the first interface module and the digital output of the tuner, wherein the decoder is configured to decompress the digital signal representing the selected program received from the digital output of the tuner, and to decompress a digital signal representing a recorded program received from the external storage device via the first interface module.

6. The system of claim 1, wherein the external storage device is included within a digital video recorder, and wherein the digital video recorder is coupled to the analog output port and to the first interface module.

7. The system of claim 6, wherein the digital video recorder includes a video digitizer and an encoder that convert the first analog signal representing the selected program into a compressed, digital signal, and wherein the digital video recorder further includes a storage medium that records the compressed, digital signal representing the selected program.

8. The system of claim 6, wherein the tuner outputs the selected program at a digital output when the selected program is represented by a digital signal.

9. The system of claim 8, wherein the digital video recorder further includes a second interface module in communication with the first interface module, and wherein the second interface module of the digital video recorder is configured to receive digital signals from the first interface module for recording on the storage medium and to retrieve recorded programs from the storage medium.

10. The system of claim 9, wherein the digital video recorder further includes a video data stream manager coupled between the encoder, the interface module and the storage medium, and wherein the video data stream manager controls access to the storage medium.

11. A method of presenting content from a content provider to a user, comprising:

selecting a program from a plurality of programs;

transmitting a first analog signal representing the selected program via a first connection and transmitting a second analog signal representing the selected program via a second connection;

transmitting the first analog signal representing the selected program to an external storage device via an analog output for recording the selected program on the external storage device;

converting the second analog signal representing the selected program to a digital representation of the second analog signal; and overlaying information to one of the selected programs represented by the digital representation of the second analog signal and a recorded program retrieved from the external storage device.

12. The method of claim 11, further comprising formatting the overlaid program and the overlay information for presentation to a user.

13. The method of claim 11, further comprising transmitting the selected program at a digital output if the selected program is represented by a digital signal.

14. The method of claim 13, further comprising decoding the digital signal and a signal representing the recorded program.

* * * * *